(12) United States Patent
Li

(10) Patent No.: US 10,281,132 B2
(45) Date of Patent: May 7, 2019

(54) WIRELESS CHARGING LAMP

(71) Applicant: DongGuan City General Success Industrial Co., LTD, Dongguan, Guangdong (CN)

(72) Inventor: Ming Li, Guangdong (CN)

(73) Assignee: DongGuan City General Success Industrial Co., LTD, Dongguan, Guangdonng Province (CN)

( * ) Notice: Subject to any disclaimer, the term of this patent is extended or adjusted under 35 U.S.C. 154(b) by 147 days.

(21) Appl. No.: 15/360,686

(22) Filed: Nov. 23, 2016

(65) Prior Publication Data

US 2017/0108206 A1    Apr. 20, 2017

(30) Foreign Application Priority Data

Oct. 18, 2016  (CN) ...................... 2016 2 1131002 U

(51) Int. Cl.
*F21V 33/00*   (2006.01)
*F21V 1/00*    (2006.01)
(Continued)

(52) U.S. Cl.
CPC ............... *F21V 33/00* (2013.01); *F21V 1/00* (2013.01); *F21V 21/02* (2013.01); *F21V 21/088* (2013.01);
(Continued)

(58) Field of Classification Search
CPC .... F21S 6/003; F21S 8/033; F21S 8/06; F21S 6/005; F21S 6/002; F21S 9/02;
(Continued)

(56) References Cited

U.S. PATENT DOCUMENTS

| | | | |
|---|---|---|---|
| 1,870,687 A * | 8/1932 | McCandless | F21S 6/003 362/275 |
| 2,073,754 A * | 3/1937 | Ozlek | F21V 21/22 248/411 |

(Continued)

FOREIGN PATENT DOCUMENTS

| | | | |
|---|---|---|---|
| CN | 104456387 A | * | 3/2015 |
| CN | 204201609 U | * | 3/2015 |

(Continued)

OTHER PUBLICATIONS

CH 2042291521 English Translation; https://dialog.proquest.com/professional/patents/lookuppatent?accountid=161361.*
(Continued)

*Primary Examiner* — Hargobind S Sawhney

(57) ABSTRACT

A wireless charging lamp belonging to the technical field of an illumination device comprises: a lamp holder, a light source, a lampshade and a supporting part. A master control circuit board and a charging emitter are provided in the lamp holder. The wireless charging lamp further comprises a charging receiver which is independently equipped, wherein the charging receiver comprises a charging receiver shell a receiving circuit board provided in the charging receiver shell. The wireless charging lamp not only has a traditional lighting function but also a wireless charging function. Compared with the conventional structures, the structure of the present invention needs neither a data line nor contacting with the digital product to achieve a charging function. The charging emitter is provided inside the lamp holder. Inserting the charging receiver into a charging interface of the digital product is capable of automatically activate the charging function.

1 Claim, 8 Drawing Sheets

(51) Int. Cl.
*F21V 21/02* (2006.01)
*F21V 21/088* (2006.01)
*H02J 7/02* (2016.01)
*F21S 6/00* (2006.01)
*F21S 8/00* (2006.01)

(52) U.S. Cl.
CPC ............... *H02J 7/025* (2013.01); *F21S 6/002* (2013.01); *F21S 6/005* (2013.01); *F21S 8/033* (2013.01)

(58) Field of Classification Search
CPC .......... F21V 1/00; F21V 21/088; F21V 21/02; H02J 7/025; H02J 5/005; H02J 50/00; H02J 50/10; H02J 7/32; H02J 17/00; H02J 50/40; H02J 7/0044; H02J 7/007
See application file for complete search history.

(56) References Cited

U.S. PATENT DOCUMENTS

| | | | | |
|---|---|---|---|---|
| 5,209,562 A | * | 5/1993 | Glassford | F21S 6/003 362/294 |
| 5,486,987 A | * | 1/1996 | Fritz, Jr. | B60Q 1/24 362/287 |
| 7,097,319 B2 | * | 8/2006 | Mauk | F21S 8/033 362/147 |
| 2001/0006463 A1 | * | 7/2001 | Fischer | F21S 8/04 362/374 |

FOREIGN PATENT DOCUMENTS

| | | | |
|---|---|---|---|
| CN | 204291521 U | * | 4/2015 |
| CN | 205101930 U | * | 3/2016 |

OTHER PUBLICATIONS

CH 204229152 Drawings; https://dialog.proquest.com/professional/patents/lookuppatent?accountid=161361.*

C 104456387 English Translation; https://dialog.proquest.com/professional/patents/lookuppatent?accountid=161361.*

* cited by examiner

WIRELESS CHARGING LAMP

CROSS REFERENCE OF RELATED APPLICATION

The present application claims priority under 35 U.S.C. 119(a-d) to CN 201621131002.5, filed Oct. 18, 2016.

BACKGROUND OF THE PRESENT INVENTION

Field of Invention

The present invention relates to the technical field of an illumination device, particularly to a lamp, and more particularly to a wireless charging lamp.

Description of Related Arts

Lamp, which is a kind of household appliance utilized in people's lives for lighting, is an indispensable tool for lighting and learning at night. However, the conventional lamps have a single function and are only capable of providing a simple function of lighting.

In addition, in the conventional arts, there are two ways for charging digital products. The first one is the commonly used wired connection charging which needs to connect a data line while charging. The advantage of the wired connection charging is that the charging efficiency thereof is high and the current is steady. The disadvantage of the wired connection charging is that digital products must be connected to the power supply through the data line while charging and the charging is restricted by the connection of the data line, which affects normal applications of the digital products. The second way for charging is wireless charging. In the wireless charging technologies on the current market, charging products can only obtain power and complete charging by being provided on an electromagnetic field contact surface or a specified point formed by a specified charging module. Although no additional data lines are required, electric appliances are not capable of achieving the charging function until contacting the electromagnetic field contact surface or the specified point. The digital products can not be operated during the charging process. Operations during the process of charging will affect normal utilization of the digital products.

SUMMARY OF THE PRESENT INVENTION

An object of the present invention is to overcome the disadvantages mentioned above and provide a wireless charging lamp which has not only the conventional lighting function but also the wireless charging function.

The object of the present invention is achieved by the following technical solutions.

A wireless charging lamp comprises: a lamp holder, a light source, a lampshade and a supporting part;

wherein the light source is provided in the lampshade, and the supporting part is for connecting the lamp holder and the light source;

a master control circuit board is provided in the lamp holder, a power plug for powering the light source is connected with the master control circuit board;

a charging emitter is provided in the lamp holder and electrically connected with the power plug; wherein the charging emitter comprises a power input module, an electromagnetic wave conversion module, an electromagnetic wave emitting module and an electromagnetic wave controlling module; electric energy passing through the charging emitter is converted to air waves by the electromagnetic wave conversion module, and then the air waves are emitted by the electromagnetic wave emitting module;

the wireless charging lamp further comprises a charging receiver which is independently provided, wherein the charging receiver comprises a charging receiver shell and a receiving circuit board provided in the charging receiver shell;

a charging connector inside a charging interface for matching and inserting a digital product is provided on an end of the charging receiver shell; the charging connector is electrically connected with the receiving circuit board;

the receiving circuit board comprises an electromagnetic wave receiving module; an electric energy conversion module and an electric energy output module; the electromagnetic wave receiving module receives air waves emitted from the electromagnetic wave emitting module, converts the air waves to electric energy by the electric energy conversion module, and finally transmits the electric energy to a digital product by the electric energy output module for performing charging.

Preferably, the supporting part is a cylinder structure capable of being bended, an upper end of the supporting part is connected with the lampshade, and a lower end of the supporting part is connected with a top surface of the lamp holder, in such a manner that the lampshade is capable of swinging in a random direction with the supporting part.

Preferably, a clamp for clamping a table is provided on a bottom surface of the lamp holder, a top surface of the clamp is fixed on the bottom surface of the lamp holder.

Preferably, the supporting part is a vertically provided tube structure, a bottom of the supporting part extends vertically downwards and connects the base, the lamp holder is provided between the base and the lampshade.

Preferably, a socket unit is provided on the lamp holder, the socket unit is fixed on a surface of the lamp holder and electrically connected with the power plug.

Preferably, the socket unit comprises at least one member selected from a group consisting of a two-pole interface and a three-pole interface.

Preferably, a control switch is provided on the lamp holder, and the control switch is a trip switch or a four section contact switch.

Preferably, the lamp holder comprises a wall holder and a dish cover, the dish cover is fixedly covered on an opening of the wall holder.

Preferably, the wall holder is vertically provided, a bottom surface of the wall holder has a location hole for being fixedly installed on a wall; the supporting part is formed by a reversed U-shaped metal bracket; wherein a first end of the reversed U-shaped metal bracket is fixedly provided on an external surface of the dish cover, and a second end of the reversed U-shaped metal bracket is connected with the lampshade.

Beneficial effects of the present invention are as follows.

1) A charging emitter is provided in the lamp. In addition, a charging receiver with an independent structure is provided on the wireless charging lamp, in such a manner that the wireless charging lamp has not only a traditional lighting function, but also a wireless charging function. Compared with the conventional structures of connecting with a data line or contacting the cell phone with a charging module for charging, the structure of the present invention completely needs neither a data line nor contacting with the digital product to achieve a charging function.

2) The charging emitter is provided inside the lamp holder. When the lamp is connected with a power source, inserting the charging receiver into a charging interface of the digital product is capable of automatically activate the charging function. The digital product can be provided on a randomly effective position that can be received by the charging receiver. The technique of the present invention is suitable for both a portable lamp and a stationary lamp.

3) The wireless charging lamp of the present invention is simple to use, easy to operate and has a wide range of application. In addition, the wireless charging lamp of the present invention has novelty and innovation for meeting the demand and development of the markets, and thus has strong competitiveness in the markets.

4) The charging receiver can be equipped with various adapters for different digital products, so as to preventing the consumers from purchasing multiple charging receivers, which not only provides convenience for the consumers but also saves the cost of consumption.

These and other objectives, features, and advantages of the present invention will become apparent from the following detailed description, the accompanying drawings, and the appended claims.

Figure 1:
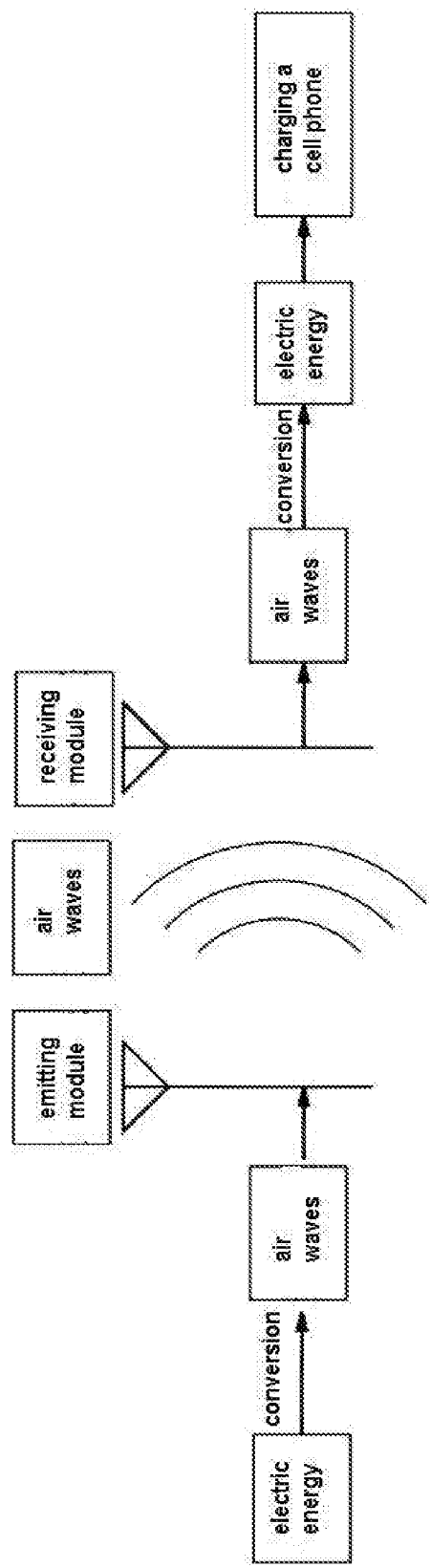
FIG. 1 is a flow chart showing a wireless charging process according to a preferred embodiment of the present invention.

Reference numbers in the Figs.: 1—lamp holder; 2—light source; 3—lampshade; 4—supporting part; 5—two-pole interface; 6—trip switch; 7—emitter sign; 8—cross bar; 9—three-pole interface; 10—base; 11—power plug; 12—cell phone; 13—charging receiver; 14—power input module; 15—electromagnetic wave conversion module; 16—electromagnetic wave emitting module; 17—electromagnetic wave controlling module; 18—charging connector; 19—electromagnetic wave receiving module; 20—electric energy conversion module; 21—electric energy output module; 22—clamp.

DETAILED DESCRIPTION OF THE PREFERRED EMBODIMENT

Further description of the present invention is illustrated in detail combining with the accompanying drawings and the preferred embodiments as follows.

Embodiment 1

Referring to FIGS. 1-5, according to an embodiment 1 of the present invention, a wireless charging lamp comprises:

a lamp holder 1, a light source 2, a lampshade 3 and a supporting part 4;

wherein the light source 2 is provided in the lampshade 3, and the supporting part 4 is for connecting the lamp holder 1 and the light source 2, and in the embodiment 1, the lamp is a table lamp; and the supporting part 4 is a cylinder structure capable of being bended, an upper end of the supporting part is connected with the lampshade 3, and a lower end of the supporting part 4 is connected with a top surface of the lamp holder 1, in such a manner that the lampshade 3 is capable of swinging in a random direction with the supporting part 4.

Figure 5:
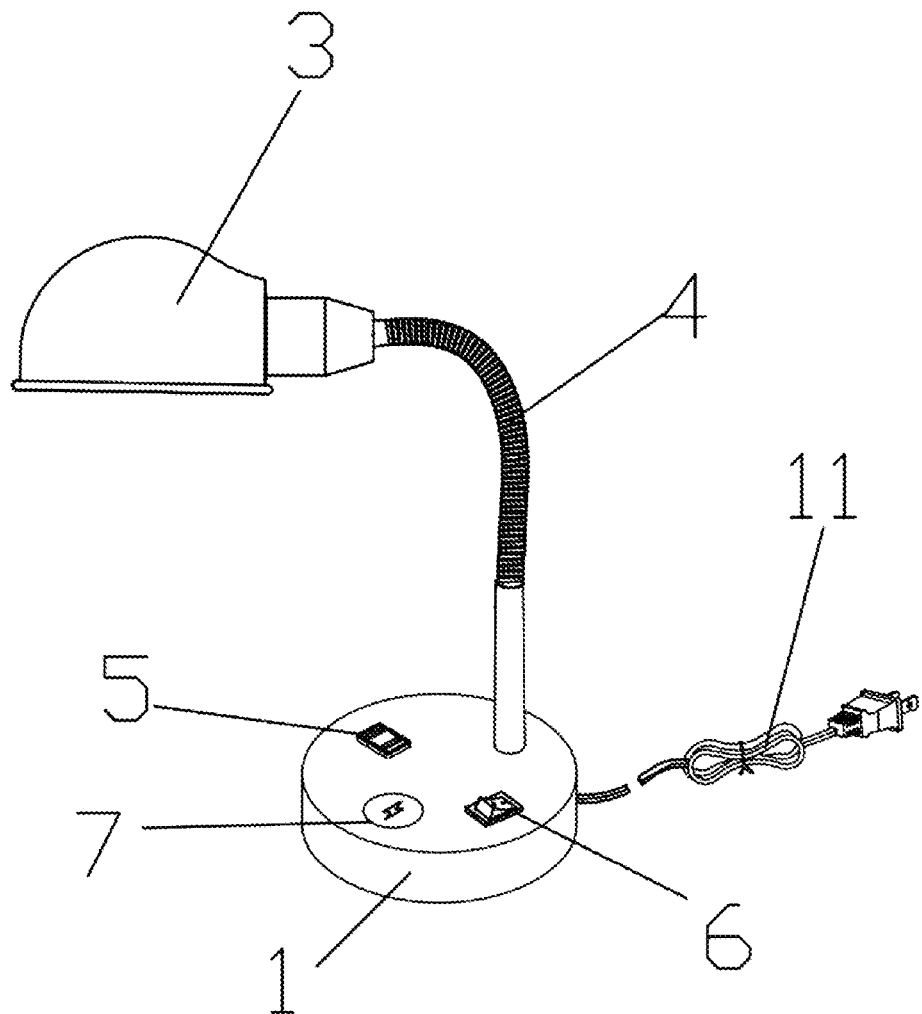
FIG. 5 is a three-dimensional structure schematic view of a wireless charging lamp according to an Embodiment 1 of the present invention.

In the embodiment 1, the lamp holder 1 has a flat cylindrical structure, a master control circuit board is provided in the lamp holder 1, a power plug 11 for powering the light source 2 is connected with the master control circuit board. As shown in FIG. 5, a socket unit and a control switch are provided on the clamp holder 1, wherein the control switch is a trip switch 6; and the socket unit comprises a two-pole interface 5, the two-pole interface 5 is fixed on a surface of the lamp holder 1 and electrically connected with the power plug 11.

Figure 2:
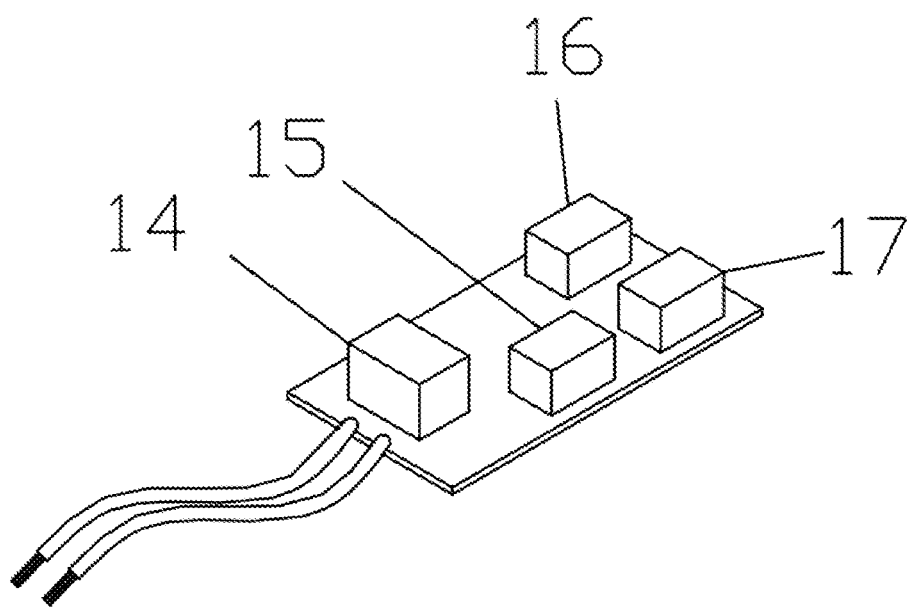
FIG. 2 is a three-dimensional structure schematic view of a charging emitter according to the preferred embodiment of the present invention.

A charging emitter is provided in the lamp holder 1 and electrically connected with the power plug 11. As shown in FIG. 2, the charging emitter comprises a power input module 14, an electromagnetic wave conversion module 15, an electromagnetic wave emitting module 16 and an electromagnetic wave controlling module 17. Electric energy passing through the charging emitter is converted to air waves by the electromagnetic wave conversion module 15, and then the air waves are emitted by the electromagnetic wave emitting module 16. An emitter sign is provided on a top surface of the lamp holder 1, so as to facilitate a user to understand and identify a specific position of the charging emitter.

Figure 3:
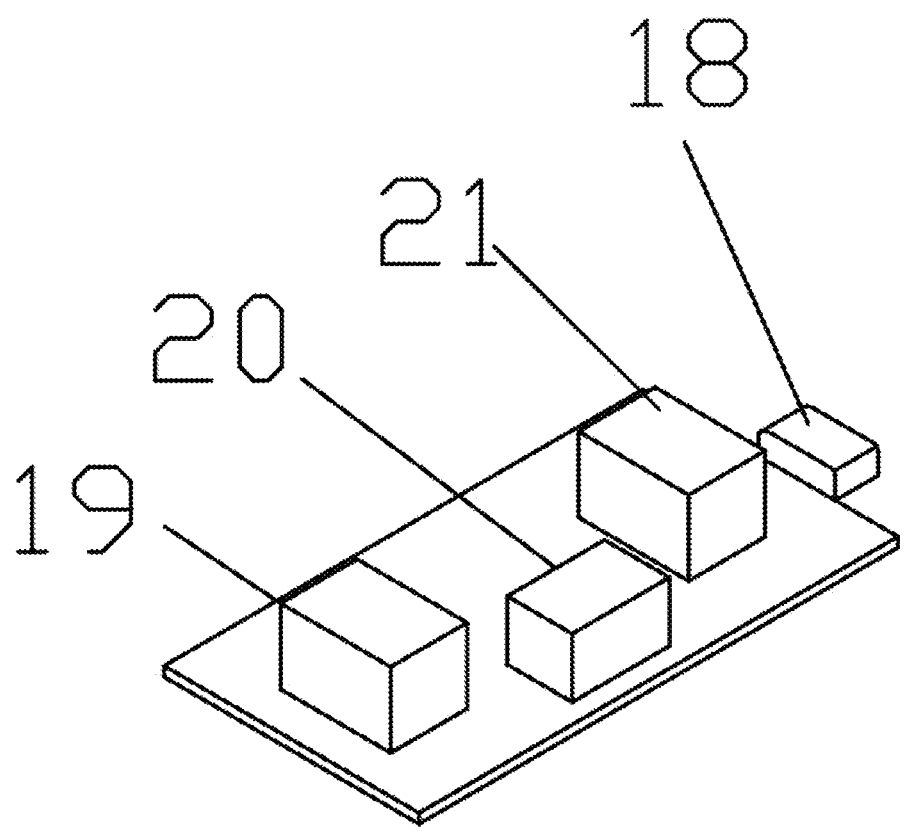
FIG. 3 is a three-dimensional structure schematic view of a receiving circuit board according to the preferred embodiment of the present invention.
Figure 4:
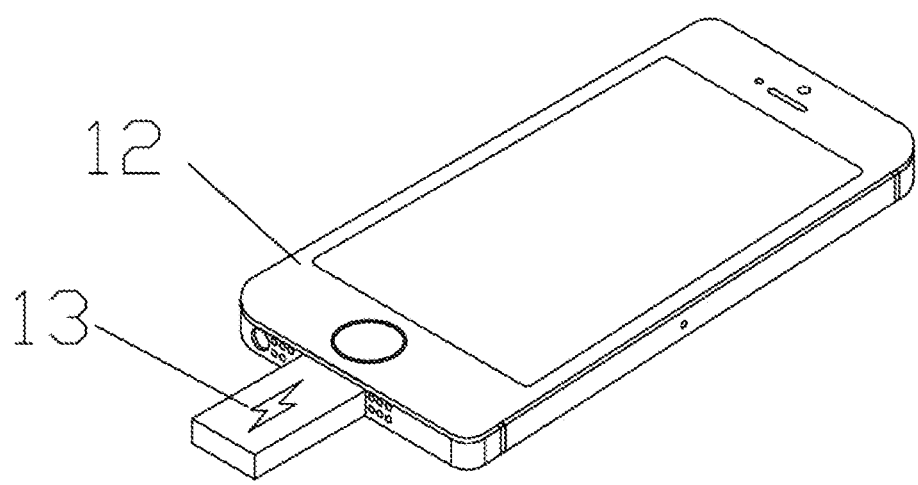
FIG. 4 is a structural schematic view showing a condition that a charging receiver is connected with a cell phone according to the preferred embodiment of the present invention.

As shown in FIG. 3 and FIG. 4, the wireless charging lamp further comprises a charging receiver 13 which is independently provided. The charging receiver 13 comprises a charging receiver shell and a receiving circuit board provided in the charging receiver shell. A charging connector 18 inside a charging interface for matching and inserting a digital product is provided on a front end of the charging receiver shell. The charging connector 18 is electrically connected with the receiving circuit board. The receiving circuit board comprises an electromagnetic wave receiving module 19; an electric energy conversion module 20 and an electric energy output module 21. The electromagnetic wave receiving module 19 receives air waves emitted from the electromagnetic wave emitting module 16, converts the air waves to electric energy by the electric energy conversion module 20, and transmits the electric energy to a digital product for charging by the electric energy output module 21.

In the embodiment 1, the digital products requiring for charging is a cell phone 12. As shown in FIG. 1, a wireless charging principle of the embodiment 1 is as follows. After the charging emitting module is connected to the power source, the electric energy is converted to air waves by the electromagnetic wave conversion module; the air waves are emitted by the emitting module and then are received by a receiving module. The charging receiver 13 connected with the cell phone 12 receives and obtains the air waves, and the air waves are then converted to electric energy by the electric energy conversion module 20, and inputted to the cell phone 12 for performing charging, in such a manner that an object of charging the cell phone 12 is achieved. Different charging adapters can be equipped for different interfaces of the cell phone 12 to provide convenience for the utilization of a user, and achieve real wireless charging.

Embodiment 2

Figure 6:
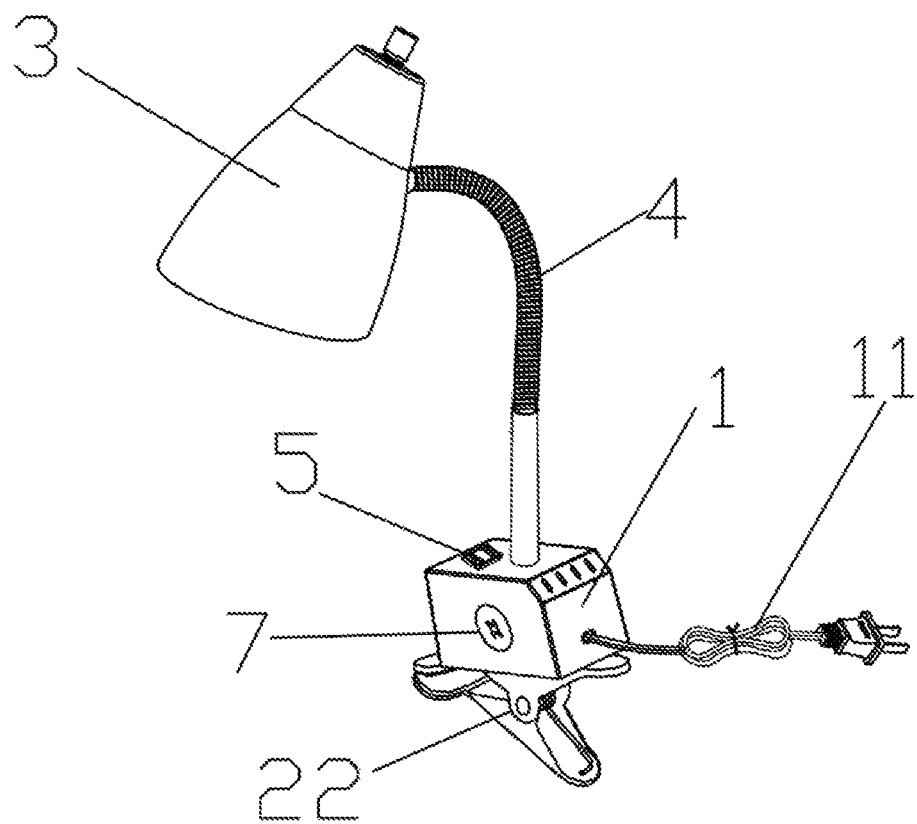
FIG. 6 is a three-dimensional structure schematic view of the wireless charging lamp according to an Embodiment 2 of the present invention.

Referring to FIG. 6, compared with the Embodiment 1, Embodiment 2 has structural differences as follows. A clamp 22 for clamping a table is provided on a bottom surface of the lamp holder 1. A top surface of the clamp 22 is fixed on the bottom surface of the lamp holder 1. In the embodiment 2, the lamp is a clamp lamp. While in use, the clamp 22 can be directly clamped to an edge or other positions of the table. The installation is stable and easy to operate. An emitter sign 7 is provided on a side surface of the lamp holder 1, so as to facilitate a user to understand and identify a specific position of the charging emitter.

Embodiment 3

Figure 7:
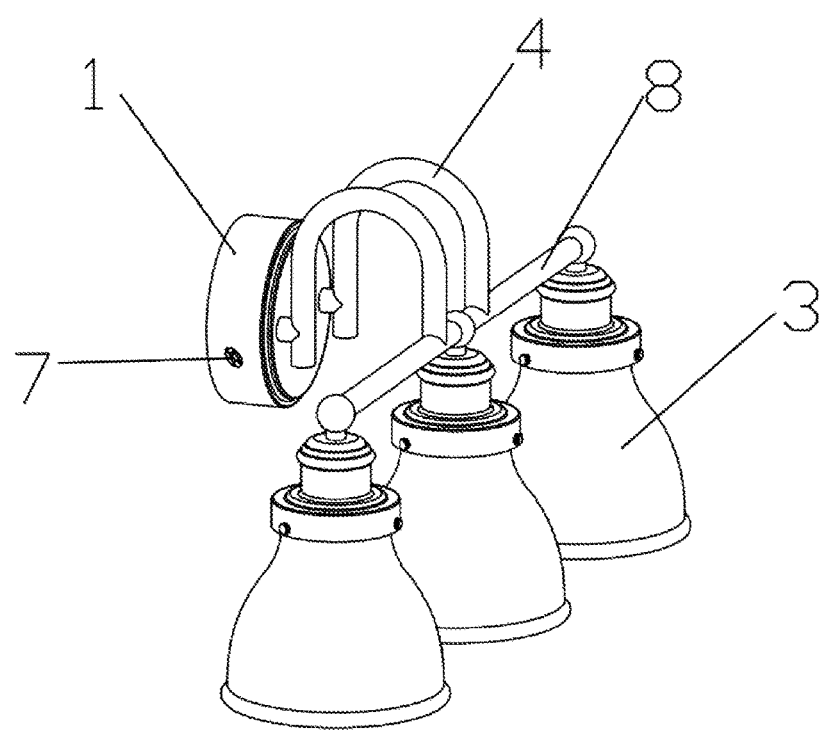
FIG. 7 is a three-dimensional structure schematic view of the wireless charging lamp according to an Embodiment 3 of the present invention.

Referring to FIG. 7, compared with the Embodiment 1, Embodiment 3 has structural differences as follows. The lamp is a wall lamp. The lamp holder 1 comprises a wall holder and a dish cover. The dish cover is fixedly covered on an opening of the wall holder. The wall holder is vertically provided. A bottom surface of the wall holder has a location hole for being fixedly installed on a wall. An emitter sign 7 is provided on a side surface of the lamp holder 1, so as to facilitate a user to understand and identify a specific position of the charging emitter. The supporting part 4 is formed by a reversed U-shaped metal bracket. A first end of the reversed U-shaped metal bracket is fixedly provided on an external surface of the dish cover, and a second end of the reversed U-shaped metal bracket is connected with the lampshade 3. In the FIG. 7, three lampshades are provided. A cross bar 8 is connected on the second end of the reversed U-shaped metal bracket. The three lampshades are horizontally distributed below the cross bar 8. Openings of the three lampshades are directed downwards, so that the light source 2 is irradiated downward.

Embodiment 4

Figure 8:
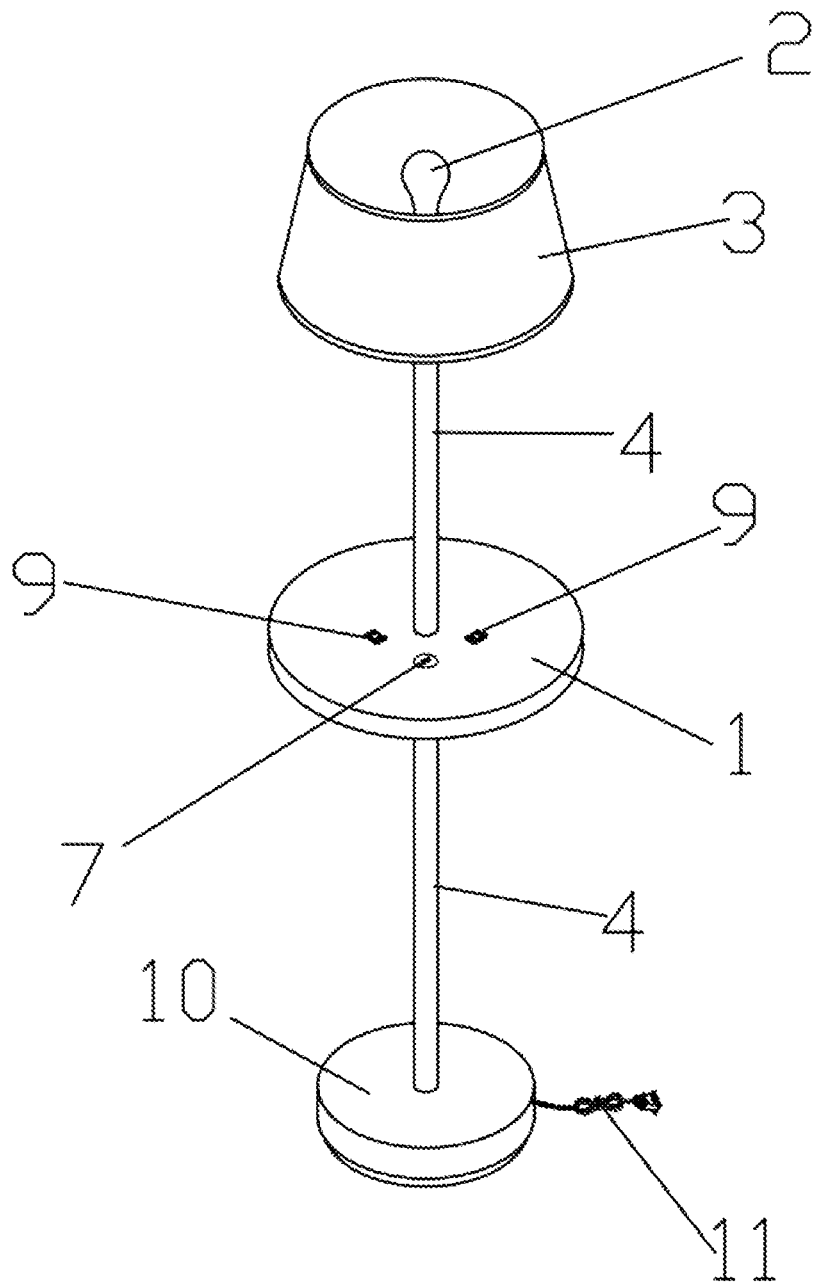
FIG. 8 is a three-dimensional structure schematic view of the wireless charging lamp according to an Embodiment 4 of the present invention.

Referring to FIG. 8, compared with the Embodiment 1, Embodiment 4 has structural differences as follows. The lamp in the embodiment 4 is a floor lamp. The supporting part 4 is a vertically provided tube structure. A bottom of the supporting part 4 extends vertically downwards and connects the base 10. The base 10 is for contacting with the ground. The lamp holder 1 is provided between the base 10 and the lampshade 3. A socket unit is provided on the lamp holder 1. The socket unit comprises two three-pole interfaces. The two three-pole interfaces are fixed on a surface of the lamp holder 1 and electrically connected with a power plug. An emitter sign 7 is provided on a top surface of the lamp holder 1, so as to facilitate a user to understand and identify a specific position of the charging emitter.

A charging emitter is provided in the lamp. In addition, a charging receiver 13 with an independent structure is provided on the wireless charging lamp, in such a manner that the wireless charging lamp has not only a traditional lighting function, but also a wireless charging function. Compared with the conventional structures of connecting with a data line or contacting the cell phone 12 with a charging module for charging, the structure of the present invention completely needs neither a data line nor contacting with the digital product to achieve a charging function. The charging emitter is provided inside the lamp holder 1. When the lamp is connected with a power source, inserting the charging receiver 13 into a charging interface of the digital product is capable of automatically activate the charging function. The digital product can be provided on a randomly effective position that can be received by the charging receiver. The technique of the present invention is suitable for both a portable lamp and a stationary lamp. The wireless charging lamp of the present invention is simple to use, easy to operate and has a wide range of application. In addition, the wireless charging lamp of the present invention has novelty and innovation for meeting the demand and development of the markets, and thus has strong competitiveness in the markets. The charging receiver can be equipped with various adapters for different digital products, so as to preventing the consumers from purchasing multiple charging receivers 13, which not only provides convenience for the consumers but also saves the cost of consumption.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A wireless charging lamp comprising: a lamp holder, a light source, a lampshade and a supporting part;
    wherein the light source is provided in the lampshade, and the supporting part is for connecting the lamp holder and the light source;
    a master control circuit board is provided in the lamp holder, a power plug for powering the light source is connected with the master control circuit board;
    a charging emitter is provided in the lamp holder and electrically connected with the power plug; wherein the charging emitter comprises a power input module, an electromagnetic wave conversion module, an electromagnetic wave emitting module and an electromagnetic wave controlling module; electric energy passing through the charging emitter is converted to air waves by the electromagnetic wave conversion module, and then the air waves are emitted by the electromagnetic wave emitting module;
    the wireless charging lamp further comprises a charging receiver which is independently provided, wherein the charging receiver comprises a charging receiver shell and a receiving circuit board provided in the charging receiver shell;
    a charging connector inside a charging interface for matching and inserting a digital product is provided on an end of the charging receiver shell; the charging connector is electrically connected with the receiving circuit board;
    the receiving circuit board comprises an electromagnetic wave receiving module;
an electric energy conversion module and an electric energy output module; the electromagnetic wave receiving module receives air waves emitted from the electromagnetic wave emitting module, converts the air waves to electric energy by the electric energy conversion module, and finally transmits the electric energy to a digital product by the electric energy output module for performing charging;

wherein the supporting part is a vertically provided tube structure, a bottom of the supporting part extends vertically downwards and connects the base, the lamp holder is provided between the base and the lampshade;

wherein a socket unit is provided on the lamp holder, the socket unit is fixed on a surface of the lamp holder and electrically connected with the power plug;

the lamp holder comprises a wall holder and a dish cover, the dish cover is fixedly covered on an opening of the wall holder;

wherein the wall holder is vertically provided, a bottom surface of the wall holder has a location hole for being fixedly installed on a wall; the supporting part is formed by a reversed U-shaped metal bracket; wherein a first end of the reversed U-shaped metal bracket is fixedly provided on an external surface of the dish cover, and a second end of the reversed U-shaped metal bracket is connected with the lampshade.

* * * * *